United States Patent [19]

Förster et al.

[11] 4,366,460

[45] Dec. 28, 1982

[54] SPRING ELEMENTS FOR SUPPORTING A SUPERCONDUCTIVE COIL

[75] Inventors: Siegfried Förster, Karlsruhe; Günter Friesinger, Eggenstein-Leopoldshafen, both of Fed. Rep. of Germany

[73] Assignee: Kernforschungszentrum Karlsruhe GmbH, Karlsruhe, Fed. Rep. of Germany

[21] Appl. No.: 130,121

[22] Filed: Mar. 13, 1980

[30] Foreign Application Priority Data

Mar. 16, 1979 [DE] Fed. Rep. of Germany ....... 2910354

[51] Int. Cl.³ .............................................. H01F 1/00
[52] U.S. Cl. ................................. 335/216; 174/15 S; 267/182; 336/DIG. 1; 336/197; 336/228
[58] Field of Search ............. 174/15 S; 267/158, 182; 335/216; 336/DIG. 1, 228, 179, 197

[56] References Cited

U.S. PATENT DOCUMENTS

| | | | |
|---|---|---|---|
| 2,332,416 | 10/1943 | Waltenberg | 428/619 |
| 3,581,366 | 6/1971 | Gottlieb et al. | 428/616 |
| 3,902,867 | 9/1975 | Ornstein et al. | 428/619 X |
| 4,066,991 | 1/1978 | Marston et al. | 335/216 |

Primary Examiner—George E. A. Halvosa
Attorney, Agent, or Firm—Spencer & Kaye

[57] ABSTRACT

A superconductive coil assembly has a housing formed of an inner shell and an outer shell, and a superconductive coil situated in a space defined between the shells. A plurality of spring elements arranged in a mosaic-like pattern on a surface area of one of the shells between the superconductive coil and the shell. Each spring element has a first flat member being of a material having a relatively small dilatation and a second flat member being of a material having a relatively large dilatation. The first and second flat members are inseparably bonded to one another. The spring elements have an effective thickness that is greater at a relatively low temperature than at a relatively high temperature.

3 Claims, 6 Drawing Figures

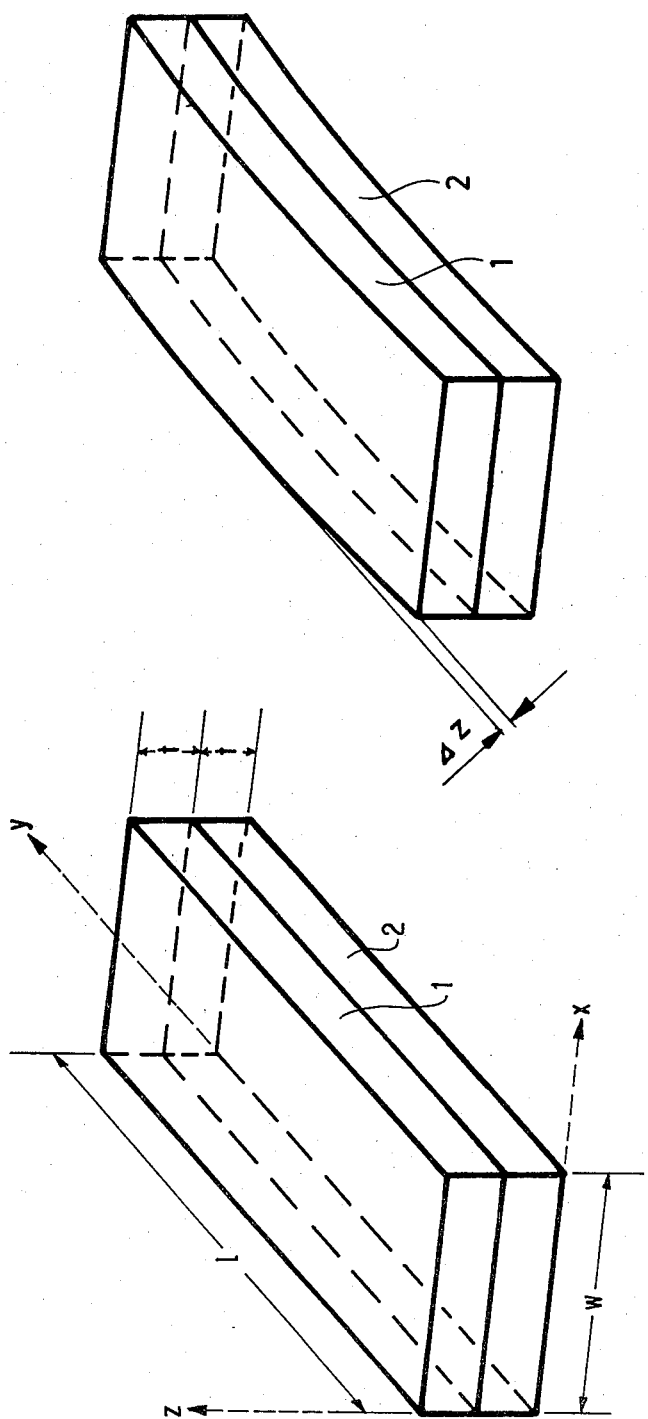

SPRING ELEMENTS FOR SUPPORTING A SUPERCONDUCTIVE COIL

BACKGROUND OF THE INVENTION

This invention relates to a spring element adapted to affect a component in a form-locking and force-locking manner at a temperature which is different from an initial, normal temperature. When structural elements of different temperature-caused elongation are joined, changes of configuration occur as a result of temperature alterations. Such configurational changes result in losses in pretension (bias) and/or cause gaps. At cryogenic temperatures superconductive cables and superconductive coils have to be installed such that their insulation is in a force-transmitting relationship with the support structure (such as a housing) in order to prevent displacements of the conductor which could cause a transition into the normal conductive state. In such an arrangement forces or pressures may be generated which, for example, in a toroidal magnetic field, may have an order of magnitude of $2 \times 10^6$ Newton as well as forces due to an asymmetrical operation and forces generated by an approximately 1.5 mm expansion of the coil in the radial direction. This means that the forces thus generated have to be taken up in a positive force-transmitting manner by the coil housing at operating temperatures of 4.2 K. If this is achieved by preventing the coil housing from shrinking, stresses in the coil housing are generated, since the temperature-caused contraction of the coil housing would have to be greater or at the most as great as that of the coil assembly. In practice these values cannot be coordinated with one another in an arbitrary manner. In case of quenching (that is, transition into the normal conductive state), the inner pressure of the helium may amount to 25 bar. Since the thin-walled conductor shell is not capable of taking up the inner pressure, the outer layers of the coil winding must be supported on all sides by the coil housing.

The required firm support of superconductive cables or superconductive coils in a structure (such as, for example, an aluminum or stainless steel housing) is rendered more diffficult due to the different temperature-caused contraction of the winding and the housing. In case of large superconducting coils for example those for fusion applications, gaps in the order of magnitude of 200 $\mu$ are to be expected at a cooling from T=293 K. to T=4.2 K.

The above-outlined problem has been only partially resolved heretofore. The structural solutions attempted were all found to have disadvantages: they require a large structural length for the compensation of the different degrees of heat expansion whereby stability problems occur and a narrow construction is not feasible. On the other hand, a greater spatial requirement in the height direction is necessary, the friction is substantial, a bias (pretension) cannot be set and further, the permissible compression stress in the direction of reinforcement will be less than in a direction perpendicular to the reinforcement.

SUMMARY OF THE INVENTION

It is an object of the invention to provide an improved structural element which has a simple shape of small dimensions and which, upon cooling from a higher temperature to a lower temperature and conversely, undergoes an increase and, respectively, a decrease in effective thickness, wherein the thickness variation is reproducible in a great number of thermal cycles and further wherein a spring force is generated upon cooling if, for example, a thickness variation is at least partially prevented.

This object and others to become apparent as the specification progresses, are accomplished by the invention, according to which, briefly stated, there is provided a first flat component made of a material of relatively small dilatation and a second flat component made of a material of relatively large dilatation; the two components are inseparably bonded to one another and further, the bonded component unit is placed in an unrestrained manner on a structural element.

The particular advantages of the invention reside, on the one hand, in that a positive, form-locking relationship between the coil and the housing is achieved if the components, at an assembling temperature of T=293 K., are installed with a clearance which corresponds to the maximum spring path (spring excursion) and, on the other hand, a positive force-transmitting relationship is achieved if the components are installed at T=293 K. in a positive, form-locking manner. With appropriately close manufacturing tolerances a predeterminable bias on the coil winding can be achieved.

BRIEF DESCRIPTION OF THE DRAWING

FIG. 1 is a perspective view of a preferred embodiment of the invention at room temperatures.

FIG. 2 is a perspective view of the same embodiment at superconductive temperatures.

DESCRIPTION OF THE PREFERRED EMBODIMENT

Figure 3:
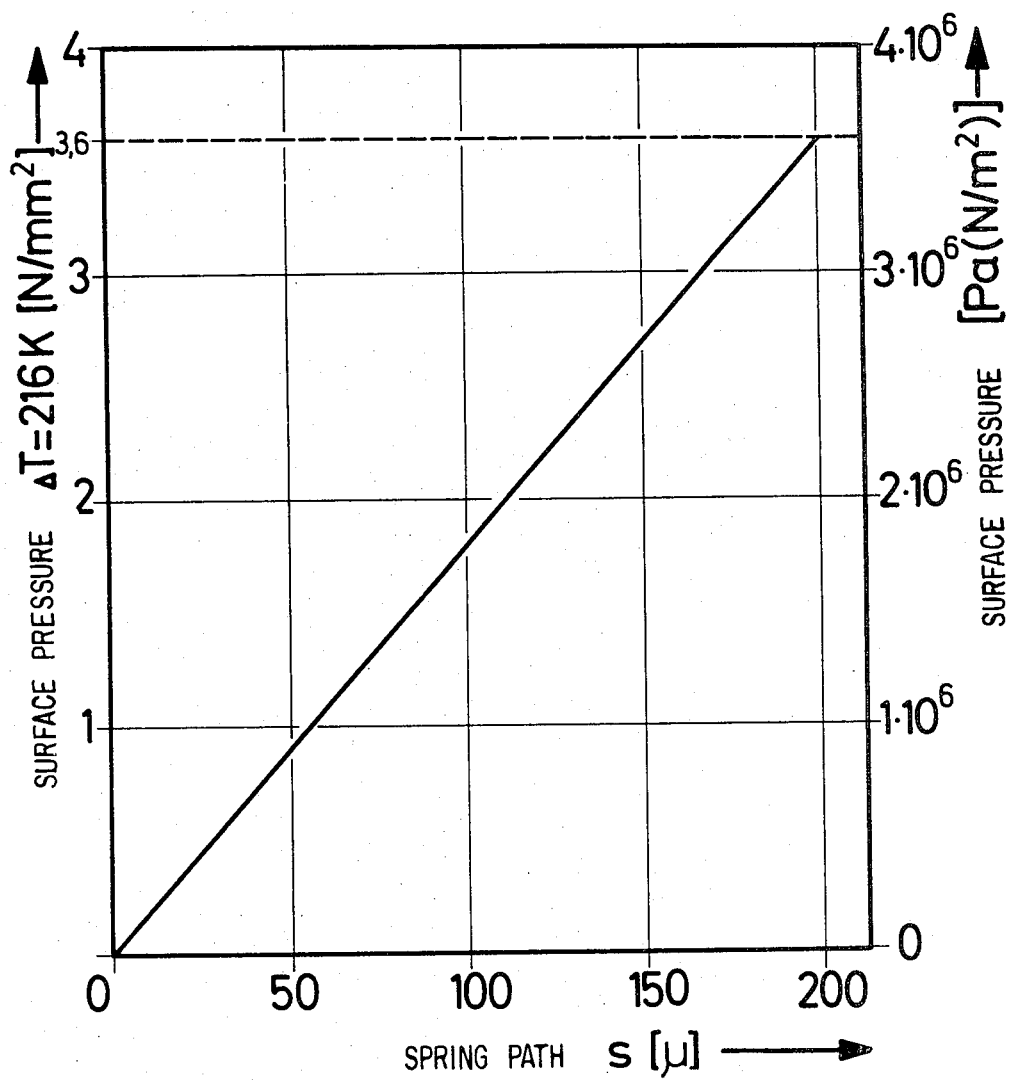
FIG. 3 is a diagram illustrating the course of the surface pressure as a function of the spring path.

Turning now to FIG. 1, the spring element shown therein is formed of a flat component 1 made of a material having a relatively small dilatation which is bonded in a non-detachable manner to a flat component 2 made of a material of relatively large dilatation.

As the structural assembly 1, 2 is cooled, there results, as shown in FIG. 2, a curved deformation $\Delta z$, the magnitude of which depends from the different dilatations of the materials and the geometry of the components 1 and 2.

The structural assembly 1, 2 is considered as a beam arranged on a structural component in an unrestrained manner in contradistinction to the arrangement of conventional bimetal elements which function as a cantilever fixed at one end (for example, in relay structures). In this manner a thickness variation of $\pm \Delta z$ is reproducible.

For demonstrating the operation of the spring element according to the invention, six samples were prepared as follows:

A flat component 2 of stainless steel (dilatation $$\frac{L_{293} - L_4}{L_{293}} = 290 \times 10^{-5})$$

was bonded by means of an electron beam weld to a flat component 1 made of Invar (dilatation $$\frac{L_{293} - L_4}{L_{293}} = 50 \times 10^{-5}).$$

The dimensions for the components 1, 2 were as follows: t=4 mm, w=8 mm and l=60 mm. Upon cooling from a temperature of T=293 K. to T=4.2 K., the stainless steel side 2 of the bonded assembly 1, 2 contracts to a greater extent than the Invar side 1, so that a concave deformation (lateral excursion) is obtained as viewed in the direction of the component 2.

If the above-described structural assembly 1, 2 is installed at T=293 K. in a form-locking manner between two structural components, for example shell 3 and coil 4, there is obtained, upon cooling, a force $F_z$ (due to the spring path s, expressed in microns); thus, for example, a surface pressure $p_z = F_z/A$, wherein $A = w \times l$ (FIG. 1). For the bending deformation (corresponding to a thickness change of $+\Delta z$) there was calculated, for a simple geometrical relationship as shown in FIG. 1, $\Delta z = 0.3$ mm. The measurements yielded $\Delta z = 0.2$ mm from a cooling from a temperature of T=293 K. to T=77 K.

Further, a force $F_z = 2770$ N and a bending stress $\sigma_b = 570$ N/mm$^2$ were calculated for cooling from a temperature of 293 K. to 4.2 K. $\sigma_b$ does not include the residual stress caused by the electron beam welding. Measurements yielded, for a cooling from a temperature of T=293 K. to T=77 K., a force of $F_z = 2000$ N in case of two samples with ten thermal cycles each, which thus means practically indentical results.

The structural height (thickness t) for achieving a force-locking relationship between the two structural components could be maintained at a small value by a "deflection" (lateral excursion, as noted above) of the contraction effect from the y direction into the z direction, which is the preferred embodiment of the invention.

For fabricating the component assembly 1, 2, electron beam welding has been chosen in order to maintain the residual stresses at the smallest possible value.

With the thermal spring element according to the invention there is thus obtained, during cooling, a thickness alteration of $+\Delta z$ and a force $F_z$ in contradistinction to known structural elements (for example, spring or an invar bar) where thickness alterations of $-\Delta z$ have occurred. The structural assembly 1, 2 requires small space as opposed to known solutions.

The structural assembly 1, 2 may find application in all environments where structural elements of different dilatation are joined for a reliable operation at alternating temperatures.

Figure 4:
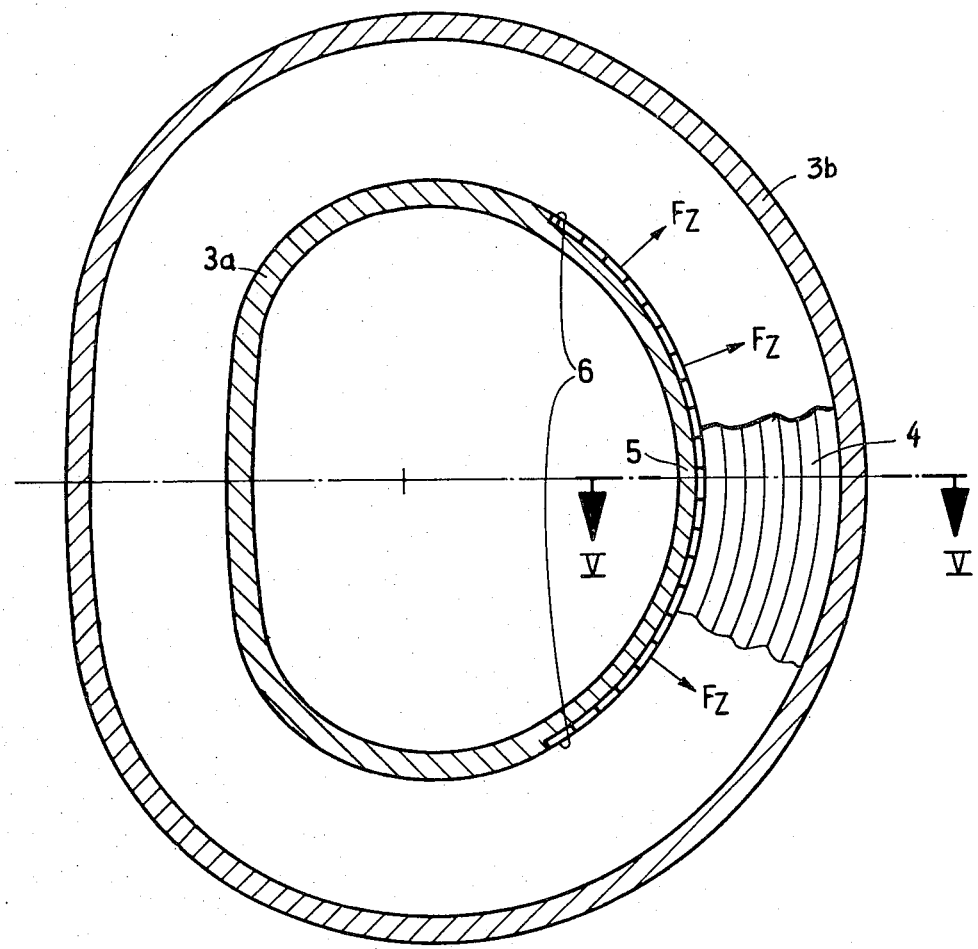
FIG. 4 is a cross-sectional view of a superconductive coil incorporating the preferred embodiment.
Figure 6:
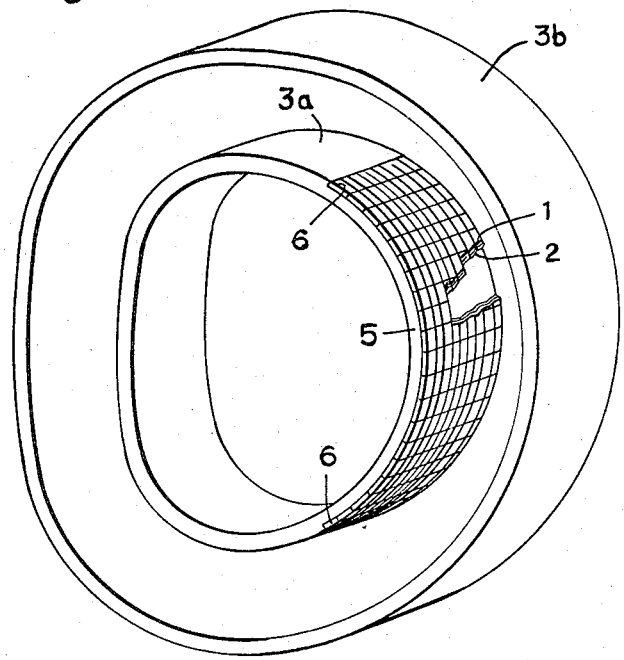
FIG. 6 is a perspective view of the structure illustrated in FIGS. 4 and 5, with the end closures removed.
Figure 5:
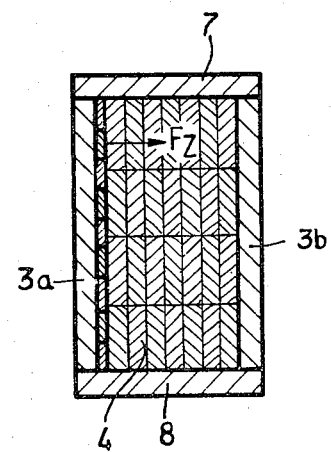
FIG. 5 is a sectional view along line V—V of FIG. 4.

Turning now to FIGS. 4, 5 and 6, the invention is incorporated in a housing for supporting superconductive coils or cables. The housing is formed of an inner shell 3a, an outer shell 3b and end plates 7 and 8. In the closed space defined between the shells 3a, 3b and the end plates 7, 8 there is provided a D-shaped coil 4 which surrounds the inner shell 3a and which, for better visibility of the housing structure, is only fragmentarily shown in FIG. 4. In FIG. 5 the coil 4 is shown in cross section. The spring elements 1, 2 are provided on a face portion 6 of a convex side 5 of the inner shell 3a. For a predetermined positioning of the spring elements in a mosaic-type arrangement, the surface area 6 of the inner shell 3a may be recessed as shown in FIGS. 4 and 6. The recessed area 6 is filled out with the spring elements 1, 2. Thus the latter are positioned between a first structural component, such as the inner shell 3a and a second structural component, such as the coil 4. At cryogenic temperatures, forces $F_z$ are generated as the spring elements 1, 2 deform as it was described above. Any gaps which would appear between the coil 4 and a shell wall are taken up by virtue of the thickness increase of the spring elements 1,2. As a desired end result, a displacement of the coil 4 with respect to the housing 3a, 3b, 7 and 8 will be prevented. Thus, dependent on its dimensions and according to the local force conditions in the coil 4, the spring elements 1, 2 may be installed with little structural height in a large area mosaic-type arrangement in the necessary numbers along a zone 6, on the convex housing sides 5 which are no longer under stress when the coil is energized. A secure reproducible fixation of the coil can be achieved upon cooling. The surface pressure can be computed in advance, so that stresses exceeding the fatigue-stress strength of the weakest component (for example, a lead-tin solder in a soldered superconducting cable) can be securely prevented.

It will be understood that the above description of the present invention is susceptible to various modifications, changes and adaptations, and the same are intended to be comprehended within the meaning and range of equivalents of the appended claims.

What is claimed is:

1. In a superconductive coil assembly having a generally D-shaped housing formed of an inner shell and an outer shell surrounding said inner shell, a generally D-shaped superconductive coil situated in a space defined between said shells; the improvement comprising a plurality of spring elements arranged in a mosaic-like pattern on a surface area on a convex portion of said inner shell between said superconductive coil and said inner shell; said spring elements being in a face-to-face engagement with said inner shell and said superconductive coil; each said spring elements having a first flat member being of a material having a relatively small dilatation and a second flat member being of a material having a relatively large dilatation, said first and second flat members being inseparably bonded to one another; said spring elements having an effective thickness that is greater at a relatively low temperature than at a relatively high temperature.

2. A superconductive coil assembly as defined in claim 1, wherein said spring elements together form a continuous surface.

3. A superconductive coil assembly as defined in claim 2, wherein said spring elements are rectangular.

* * * * *